(12) United States Patent
Arunkumar et al.

(10) Patent No.: US 11,765,276 B2
(45) Date of Patent: Sep. 19, 2023

(54) BLOCKCHAIN FOR COMMUNICATION OF SUBSCRIBER DATA RECORDS BETWEEN PUBLIC LAND MOBILE NETWORKS

(71) Applicant: Telefonaktiebolaget LM Ericsson (publ), Stockholm (SE)

(72) Inventors: K Arunkumar, Chennai (IN); Darwin Chandran, Chennai (IN); Karthikeyan Chandrasekar, Chennai (IN); Ramkumar N, Chennai (IN); Gopala Krishnan Ramasubbu, Virudhunagar (IN); Ravi Sekhar Reddy V, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 17/437,020

(22) PCT Filed: Mar. 7, 2019

(86) PCT No.: PCT/IN2019/050193
§ 371 (c)(1),
(2) Date: Sep. 7, 2021

(87) PCT Pub. No.: WO2020/178844
PCT Pub. Date: Sep. 10, 2020

(65) Prior Publication Data
US 2022/0182496 A1   Jun. 9, 2022

(51) Int. Cl.
*H04M 15/00* (2006.01)
*H04W 4/24* (2018.01)
*H04W 84/04* (2009.01)

(52) U.S. Cl.
CPC ........... *H04M 15/41* (2013.01); *H04M 15/44* (2013.01); *H04M 15/48* (2013.01); *H04W 4/24* (2013.01); *H04W 84/042* (2013.01)

(58) Field of Classification Search
CPC ...... H04M 15/41; H04M 15/44; H04M 15/48; H04W 4/24; H04W 84/042; H04L 12/1403; H04L 12/1428
(Continued)

(56) References Cited

U.S. PATENT DOCUMENTS

| 10,095,888 B1 | 10/2018 | Lee et al. |
| 2014/0357219 A1 | 12/2014 | Nicolaescu et al. |

FOREIGN PATENT DOCUMENTS

| CN | 107995003 A | 5/2018 |
| CN | 108632480 A | 10/2018 |

(Continued)

OTHER PUBLICATIONS

International Search Report and Written Opinion for Application No. PCT/IN2019/050193, dated May 24, 2019, 9 pages.
(Continued)

*Primary Examiner* — Huy C Ho
(74) *Attorney, Agent, or Firm* — Nicholson De Vos Webster & Elliott LLP (57) ABSTRACT

Mechanisms for implementing a billing process between a first Public Land Mobile Network (PLMN1) and a second Public Land Mobile Network (PLMN2) for a subscriber of the PLMN1 that visits the PLMN2. A method comprises establishing a smart contract between the PLMN1, the PLMN2, and a Data Clearance House (DCH). The method comprises sending a subscriber usage record, represented by a distributed ledger, of the subscriber from the PLMN2 to the DCH using a blockchain upon the subscriber having visited the PLMN2, wherein the blockchain is based on the smart contract. The method comprises sending the subscriber usage record from the DCH to the PLMN1 using the blockchain.

14 Claims, 7 Drawing Sheets

(58) Field of Classification Search
USPC .......................................................... 455/406
See application file for complete search history.

(56) References Cited

FOREIGN PATENT DOCUMENTS

EP          3579494 A1 * 12/2019  ............. H04L 63/12
WO     2017207314 A1    12/2017

OTHER PUBLICATIONS

International Preliminary Report on Patentability, PCT App. No. PCT/IN2019/050193, dated Sep. 16, 2021, 8 pages.
Supplementary European Search Report and Search Opinion, EP App. No 19917865.8, dated Feb. 1, 2022, 10 pages.
Christian Cachin et al., "Blockchain Consensus Protocols in the Wild", IBM Research—Zurich, Jul. 7, 2017, pp. 1-24.
Communication pursuant to Article 94(3) EPC, EP App. No. 19917865.8, dated Feb. 22, 2023, 7 pages.

* cited by examiner

BLOCKCHAIN FOR COMMUNICATION OF SUBSCRIBER DATA RECORDS BETWEEN PUBLIC LAND MOBILE NETWORKS

CROSS-REFERENCE TO RELATED APPLICATIONS

This application is a National stage of International Application No. PCT/IN2019/050193, filed Mar. 7, 2019, which is hereby incorporated by reference.

TECHNICAL FIELD

Embodiments presented herein relate to methods, a Data Clearance House (DCH) node, a node of a first Public Land Mobile Network (PLMN1), a node of a second Public Land Mobile Network (PLMN2), computer programs, and a computer program product for implementing a billing process between PLMN1 and PLMN2 for a subscriber of PLMN1 that visits PLMN2.

BACKGROUND

In communications networks, there may be a challenge to obtain good performance and capacity for a given communications protocol, its parameters and the physical environment in which the communications network is deployed.

For example, roaming is the process where a subscriber is used outside the range of its home cellular network and connects to another available cellular network. In such scenarios the resource usage as consumed by subscriber when connecting to this other available cellular network should be recorded and handled correctly such that the subscriber can be billed accordingly.

In some scenarios the transactions between the home network and the roaming network are handled through a data clearance house (DCH). In more detail, one primary aim of The DCH is to support wireless service providers in managing their global roaming operations. In general the DCH might be responsible for handling the following services or subset of services. The DCH might act as a roaming agreement broker by taking responsibility for negotiation, preparation, and documentation of roaming agreements on behalf of a PLMN. The DCH might handle roaming partner management by acting as a single point of contact for managing multiple roaming partners. The DCH might facilitate inter-standard roaming. This includes, for example, management of different settlement and billing formats, signaling standards, switch incompatibilities, and proprietary extensions and of other technology issues. The DCH might be configured to handle data clearing and settlement by providing a centralized process for the exchange of call/data usage records of the subscriber in terms of Transferred Account Procedures (TAP; including its evolutions TAP2 and TAP3) data or Cellular Intercarrier Billing Exchange Roamer (CIBER) data, monthly financial settlement, electronic data delivery, management, and currency, etc. The DCH might be configured to handle conversion between different TAP formats. The DCH might be configured to handle fraud management. For example, the DCH might help network operators in early detection of frauds.

That is, the DCH is currently acting as a centric entity validating and routing the TAP file from the operator of the visiting PLMN of the subscriber to the operator of the home PLMN of the subscriber. There is currently not any transparency in this file handling because the transaction processing is offline and it can be tampered as the transaction is mutable (i.e., liable to change). This could create a conflict between the operator of the visiting PLMN and the operator of the home PLMN, potentially causing a loss of revenue for the operator of the home PLMN. Current ways to handle this is to let the DCH generate invoicing reports and evaluating the roaming transactions with the operator of the home PLMN. However, this does not avoid the possibility that the call/data usage records are manipulated when being handled by the DCH.

Hence, there is still a need for an improved handling of call/data usage records.

SUMMARY

An object of embodiments herein is to provide efficient handling of call/data usage records that does not suffer from the above issues, or at least where the above issues are mitigated or reduced.

According to a first aspect there is presented a method for implementing a billing process between a PLMN1 and a PLMN2 for a subscriber of the PLMN1 that visits the PLMN2. The method comprises establishing a smart contract between the PLMN1, the PLMN2, and a DCH. The method comprises sending a subscriber usage record, represented by a distributed ledger, of the subscriber from the PLMN2 to the DCH using a blockchain upon the subscriber having visited the PLMN2, wherein the blockchain is based on the smart contract. The method comprises sending the subscriber usage record from the DCH to the PLMN1 using the blockchain.

According to a second aspect there is presented a system for implementing a billing process between a PLMN1 and a PLMN2 for a subscriber of the PLMN1 that visits the PLMN2. The system comprises the PLMN1, the PLMN2, and a DCH. The system is configured to establish a smart contract between the PLMN1, the PLMN2, and the DCH. The system is configured to send a subscriber usage record, represented by a distributed ledger, of the subscriber from the PLMN2 to the DCH using a blockchain upon the subscriber having visited the PLMN2, wherein the blockchain is based on the smart contract. The system is configured to send the subscriber usage record from the DCH to the PLMN1 using the blockchain.

According to a third aspect there is presented a method for implementing a billing process between a PLMN1 and a PLMN2 for a subscriber of the PLMN1 that visits the PLMN2. The method is performed by a DCH node. The method comprises establishing a smart contract between the PLMN1, the PLMN2, and the DCH. The method comprises obtaining a subscriber usage record, represented by a distributed ledger, of the subscriber from the PLMN2 and using a blockchain upon the subscriber having visited the PLMN2, wherein the blockchain is based on the smart contract. The method comprises sending the subscriber usage record to the PLMN1 using the blockchain.

According to a fourth aspect there is presented DCH node for implementing a billing process between a PLMN1 and a PLMN2 for a subscriber of the PLMN1 that visits the PLMN2. The DCH node comprises processing circuitry. The processing circuitry is configured to cause the DCH node to establish a smart contract between the PLMN1, the PLMN2, and the DCH. The processing circuitry is configured to cause the DCH node to obtain a subscriber usage record, represented by a distributed ledger, of the subscriber from the PLMN2 and using a blockchain upon the subscriber having visited the PLMN2, wherein the blockchain is based on the smart contract. The processing circuitry is configured to cause the DCH node to send the subscriber usage record to the PLMN1 using the blockchain.

According to a fifth aspect there is presented a computer program for implementing a billing process between a PLMN1 and PLMN2 for a subscriber of PLMN1 that visits PLMN2, the computer program comprising computer program code which, when run on processing circuitry of a DCH node, causes the DCH node to perform a method according to the third aspect.

According to a sixth aspect there is presented a method for implementing a billing process between a PLMN1 and a PLMN2 for a subscriber of the PLMN1 that visits the PLMN2. The method is performed by a node in the PLMN2. The method comprises establishing a smart contract between the PLMN1, the PLMN2, and a DCH. The method comprises sending a subscriber usage record, represented by a distributed ledger, of the subscriber to the PLMN1 via the DCH and using a blockchain upon the subscriber having visited the PLMN2, wherein the blockchain is based on the smart contract.

According to a seventh aspect there is presented a node in a PLMN2 for implementing a billing process between a PLMN1 and the PLMN2 for a subscriber of the PLMN1 that visits the PLMN2. The node comprises processing circuitry. The processing circuitry is configured to cause the node to establish a smart contract between the PLMN1, the PLMN2, and a DCH. The processing circuitry is configured to cause the node to send a subscriber usage record, represented by a distributed ledger, of the subscriber to the PLMN1 via the DCH and using a blockchain upon the subscriber having visited the PLMN2, wherein the blockchain is based on the smart contract.

According to an eight aspect there is presented a computer program for implementing a billing process between a PLMN1 and PLMN2 for a subscriber of PLMN1 that visits PLMN2, the computer program comprising computer program code which, when run on processing circuitry of a PLMN2 node, causes the PLMN2 node to perform a method according to the sixth aspect.

According to a ninth aspect there is presented a method for implementing a billing process between a PLMN1 and a PLMN2 for a subscriber of the PLMN1 that visits the PLMN2. The method is performed by a node in the PLMN1. The method comprises establishing a smart contract between the PLMN1, the PLMN2, and a DCH. The method comprises obtaining a subscriber record, represented by a distributed ledger, of the subscriber from the PLMN2 via the DCH and using a blockchain upon the subscriber having visited the PLMN2, wherein the blockchain is based on the smart contract.

According to a tenth aspect there is presented a node in a PLMN1 for implementing a billing process between the PLMN1 and a PLMN2 for a subscriber of the PLMN1 that visits the PLMN2. The node comprises processing circuitry. The processing circuitry is configured to cause the node to establish a smart contract between the PLMN1, the PLMN2, and a DCH. The processing circuitry is configured to cause the node to obtain a subscriber record, represented by a distributed ledger, of the subscriber from the PLMN2 via the DCH and using a blockchain upon the subscriber having visited the PLMN2, wherein the blockchain is based on the smart contract.

According to an eleventh aspect there is presented a computer program for implementing a billing process between a PLMN1 and PLMN2 for a subscriber of PLMN1 that visits PLMN2, the computer program comprising computer program code which, when run on processing circuitry of a PLMN1 node, causes the PLMN1 node to perform a method according to the ninth aspect.

According to a twelfth aspect there is presented a computer program product comprising a computer program according to at least one of the fourth aspect, the eighth aspect, and the eleventh aspect and a computer readable storage medium on which the computer program is stored. The computer readable storage medium can be a non-transitory computer readable storage medium.

Advantageously these methods, these DCH nodes, these PLMN2 nodes, these PLMN1 nodes, this system, and these computer programs provide efficient handling of call/data usage records.

Advantageously, this avoids the above issues to be avoided.

Advantageously, this prevents any party from being able to update the transactions without the approval from the PLMN1, the PLMN2, and the DCH.

Advantageously, any modification of the state of transactions will be visible to the PLMN1, the PLMN2, and the DCH.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
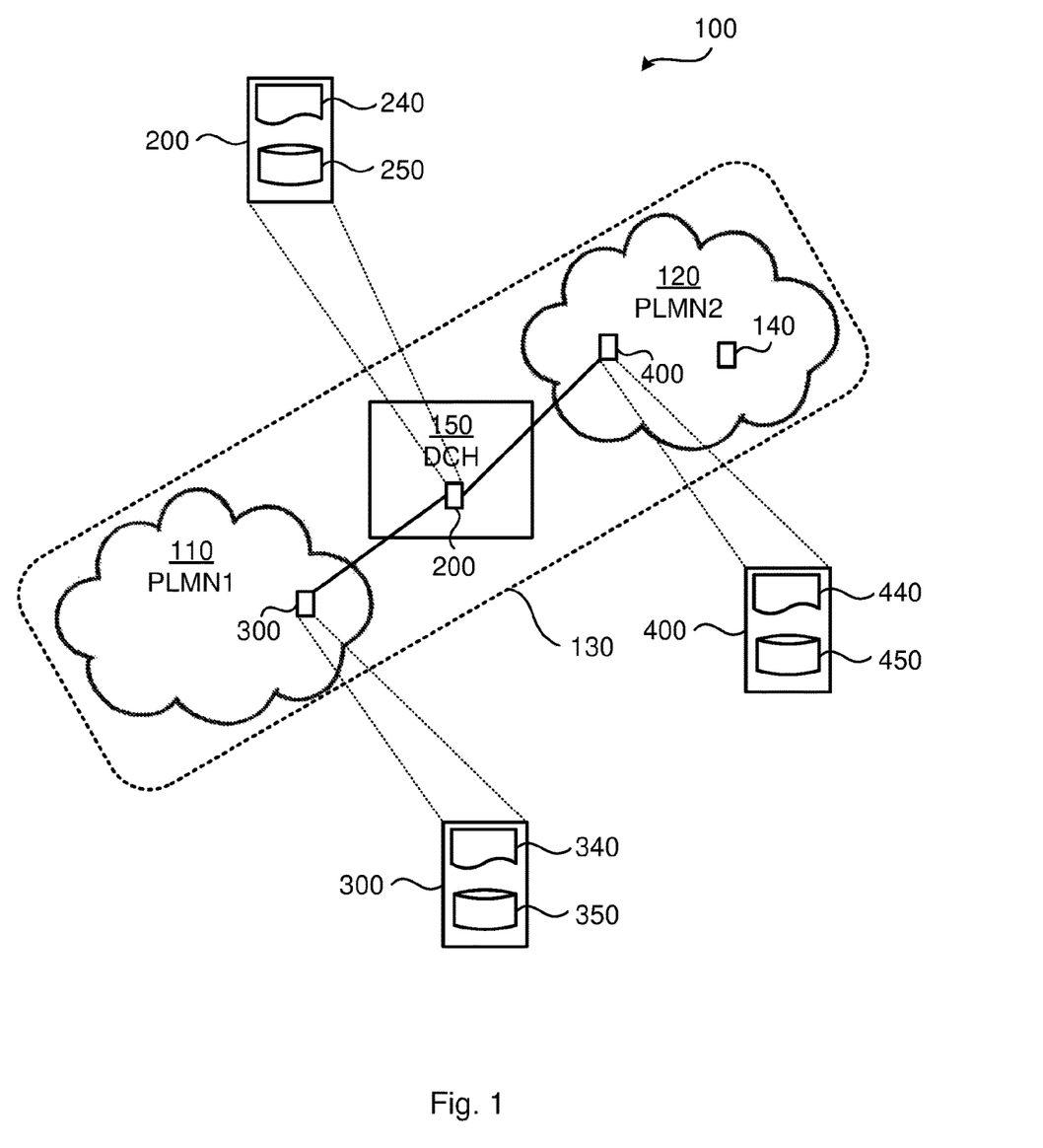
FIG. 1 is a schematic diagram illustrating a communication system according to embodiments.

FIG. 1 is a schematic diagram illustrating a communication system 100 where embodiments presented herein can be applied. The communication system 100 comprises a number of PLMN:s, here exemplified by a first PLMN, denoted PLMN1, 110 and a second PLMN, denoted PLMN2 120, where the PLMN:s are configured to communicate through a DCH 150. As schematically illustrated in the figure, the DCH 150 comprises a DCH node 200.

As the skilled person understands, each of the PLMN:s comprises a number of entities, functions, and devices, such as radio access network nodes in one or more radio access networks, and core network nodes in one or more core networks. In particular, the PLMN1 110 comprises a PLMN1 node 300 and the PLMN2 120 comprises a PLMN2 node 400, the functionalities of which will be disclosed below. In some instances the PLMN1 node 300 will be denoted a node in PLMN1, and the PLMN2 node 400 will be denoted a node in PLMN2.

The communication between the DCH node 200, the PLMN1 node 300, and the PLMN2 node 400 is facilitated by the use of a blockchain, and the PLMN1 110, the PLMN2 120, and the DCH 150 in some aspects therefore are considered as being parts of a private blockchain network 130. Further details of how the DCH node 200, the PLMN1 node 300, and the PLMN2 node 400 communicate by means of the blockchain will be disclosed below.

The private blockchain network 130 will act as a transparent partner billing settlement platform. However, entities outside the private blockchain network 130 cannot modify, or even access, transactions as communicated between the PLMN1 110, the PLMN2 120, and the DCH 150 using the blockchain. Each of the DCH node 200, the PLMN1 node 300, and the PLMN2 node 400 stores a smart contract 240, 340, 440 for controlled access to the blockchain. Further, as schematically illustrated in the figure, each of the DCH node 200, the PLMN1 node 300, and the PLMN2 node 400 comprises a respective data storage 250, 350, 360 storing rate plans, subscriber details, etc.

The embodiments disclosed herein relate to mechanisms for implementing a billing process between PLMN1 110 and PLMN2 120 for a subscriber 140 of PLMN1 110 that visits PLMN2 120. In this respect, the subscriber 140 might be a terminal device, user equipment (UE), smartphone, network equipped sensor, Internet of Things (IoT) device, network equipped vehicle, etc.

In order to obtain such mechanisms there is provided a DCH node 200, a method performed by the DCH node 200, a computer program product comprising code, for example in the form of a computer program, that when run on processing circuitry of the DCH node 200, causes the DCH node 200 to perform the method. In order to obtain such mechanisms there is further provided a PLMN2 node 400, a method performed by the PLMN2 node 400, and a computer program product comprising code, for example in the form of a computer program, that when run on processing circuitry of the PLMN2 node 400, causes the PLMN2 node 400 to perform the method. In order to obtain such mechanisms there is further provided a PLMN1 node 300, a method performed by the PLMN1 node 300, and a computer program product comprising code, for example in the form of a computer program, that when run on processing circuitry of the PLMN1 node 300, causes the PLMN1 node 300 to perform the method.

Figure 2:
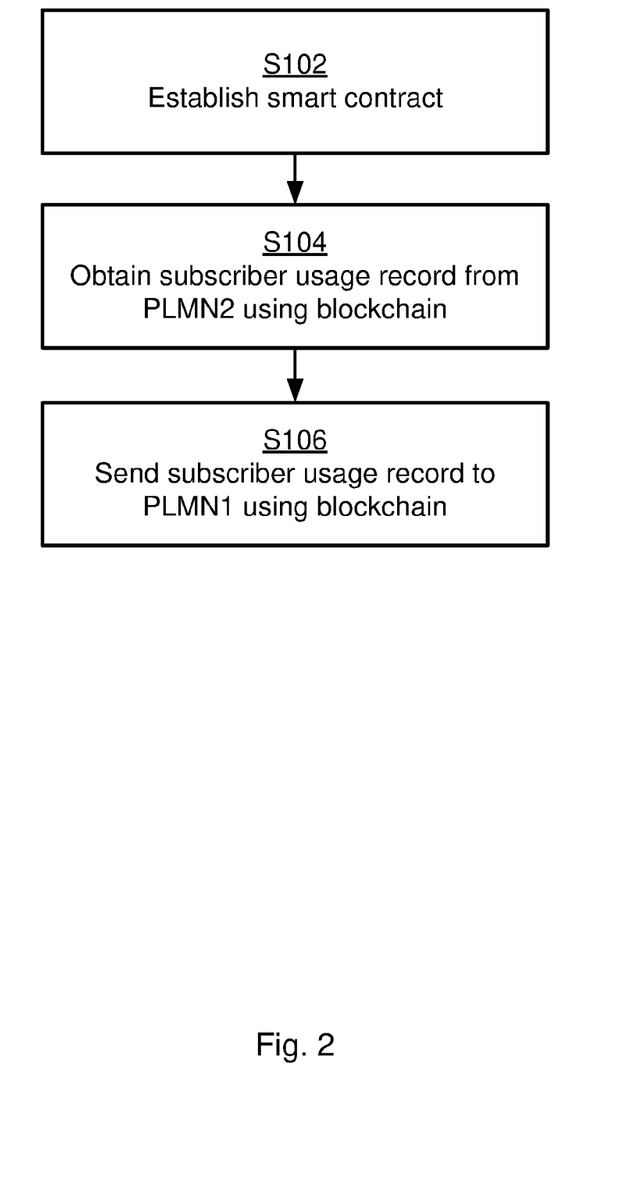
FIGS. 2, 3, and 4 are flowcharts of methods according to embodiments.

Reference is now made to FIG. 2 illustrating a method for implementing a billing process between a PLMN1 110 and PLMN2 120 for a subscriber 140 of PLMN1 110 that visits PLMN2 120 as performed by the DCH node 200 according to an embodiment.

S102: The DCH node 200 establishes a smart contract 240, 340, 440 between the PLMN1 110, the PLMN2 120, and the DCH 150.

S104: The DCH node 200 obtains a subscriber usage record of the subscriber 140 from the PLMN2 120. The subscriber usage record is obtained upon the subscriber 140 having visited the PLMN2 120. The subscriber usage record is represented by a distributed ledger. The subscriber usage record is obtained using a blockchain. The blockchain is based on the smart contract 240, 340, 440.

S106: The DCH node 200 sends the subscriber usage record to the PLMN1 110 using the blockchain.

Embodiments relating to further details of this method will be disclosed below.

Figure 3:
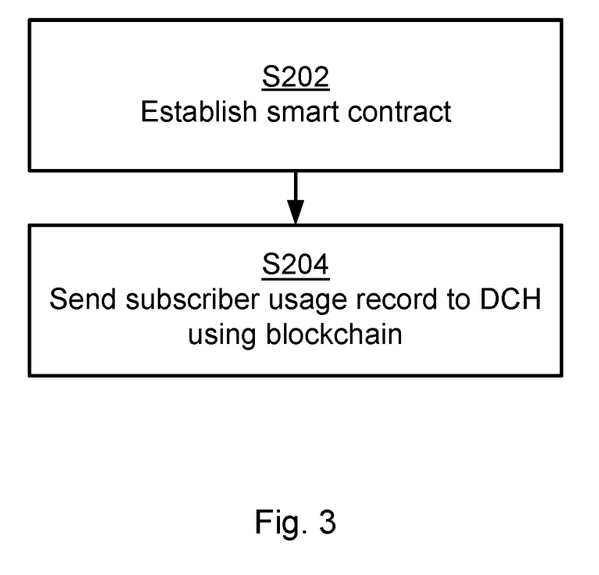

Reference is now made to FIG. 3 illustrating a method for implementing a billing process between a PLMN1 110 and PLMN2 120 for a subscriber 140 of PLMN1 110 that visits PLMN2 120 as performed by the PLMN2 node 400 according to an embodiment.

S202: The PLMN2 node 400 establishes a smart contract 240, 340, 440 between the PLMN1 110, the PLMN2 120, and the DCH 150.

S204: The PLMN2 node 400 sends a subscriber usage record of the subscriber 140 to the PLMN1 110 via the DCH 150. The subscriber usage record is sent upon the subscriber 140 having visited the PLMN2 120. The subscriber usage record is represented by a distributed ledger. The subscriber usage record is sent using a blockchain. The blockchain is based on the smart contract 240, 340, 440.

Embodiments relating to further details of this method will be disclosed below.

Figure 4:
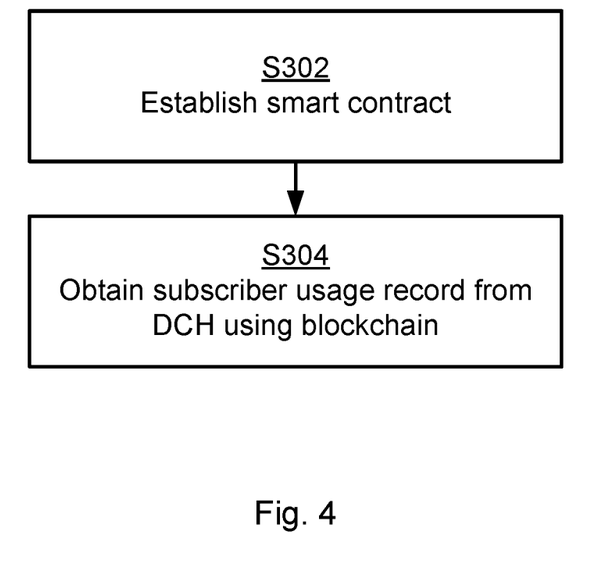

Reference is now made to FIG. 4 illustrating a method for implementing a billing process between a PLMN1 110 and PLMN2 120 for a subscriber 140 of PLMN1 110 that visits PLMN2 120 as performed by the PLMN1 node 300 according to an embodiment.

S302: The PLMN1 node 300 establishes a smart contract 240, 340, 440 between the PLMN1 110, the PLMN2 120, and the DCH 150.

S304: The PLMN1 node 300 obtains a subscriber 140 record of the subscriber 140 from the PLMN2 120 via the DCH 150. The subscriber usage record is obtained upon the subscriber 140 having visited the PLMN2 120. The subscriber usage record is represented by a distributed ledger. The subscriber usage record is obtained using a blockchain. The blockchain is based on the smart contract 240, 340, 440.

Embodiments relating to further details of all the above methods disclosed with reference to FIGS. 2, 3, and 4 will now be disclosed.

There could be different types of smart contracts 240, 340, 440. In some aspects the smart contracts 240, 340, 440 aggregate the services offered by the PLMN2 120 (for subscribers 140 of PLMN1 110 that visits PLMN2 120) and are shared by the PLMN1 110 with the DCH 150. In some aspects the smart contract 240, 340, 440 is related to rate plans as agreed between the PLMN1 110 and the PLMN2

120 and will hold the information of agreed rate plans to process transaction data. That is, according to an embodiment, the smart contract 240, 340, 440 holds information of agreed rate plans between the PLMN1 110 and the PLMN2 120 for the PLMN2 120 to process transaction data, as represented by the subscriber usage record, for the subscriber 140. In some aspects the smart contract 240, 340, 440 is related to rules for how the PLMN1 110, the PLMN2 120, and the DCH 150 might access the subscriber usage record. That is, according to an embodiment, the smart contract 240, 340, 440 holds information of rules for controlling access to the subscriber usage record from the PLMN1 110, the PLMN2 120, and the DCH 150. In some examples, according to the smart contract 240, 340, 440, only the DCH 150 is allowed to, as required by the billing process, generate billing information from the subscriber usage record.

Figure 5:
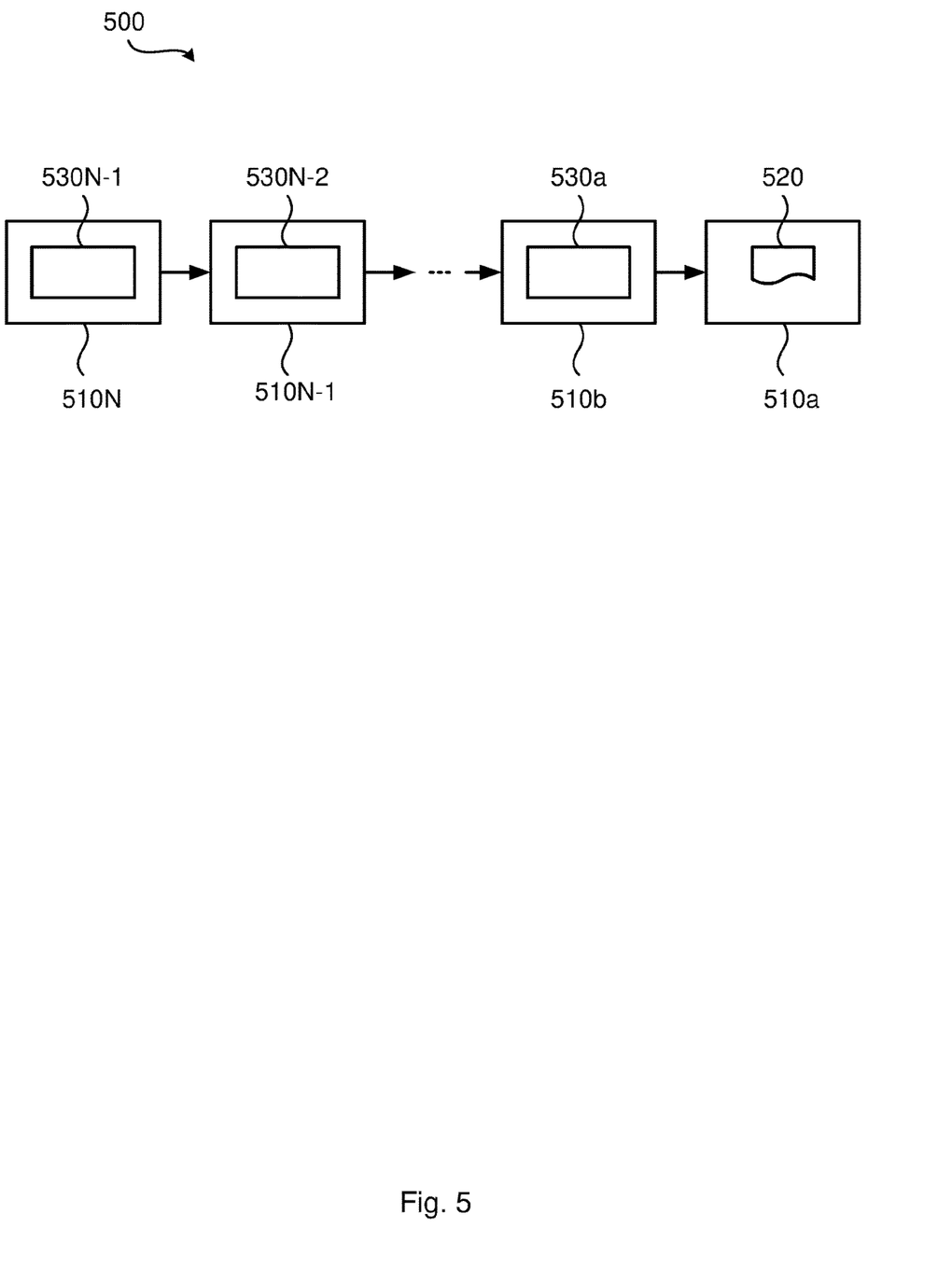
FIG. 5 is a schematic diagram illustrating a blockchain according to an embodiment.

By virtue of the blockchain, the subscriber usage record is maintained in a safe and secured manner and enables transaction processing and control of the usage of the subscriber usage record according to appropriate data access privileges. There may be different ways to form the blockchain. FIG. 5 schematically illustrates a blockchain 500 according to an embodiment. As is understood by the person skilled in the art, a blockchain 500 is generally composed of N>1 blocks 510a, 510b, . . . , 510N-1, 510N. The blocks 510a:510N in the blockchain 500 might hold batches of valid transactions 530a, . . . , 530N-2, 530N-1 that might be hashed and encoded into a Merkle tree. For each transaction a unique hash code will be generated. Each block 510a:510N might include the cryptographic hash of the prior block 510a:510N in the blockchain 500, linking the blocks. Thereby, each transaction might be associated with the previous transaction hash code. The linked blocks form a chain. This iterative process confirms the integrity of the previous block, all the way back to the original genesis block 510a. By means of the blockchain 500 all transactions are thereby made immutable and hence it is not possible to tamper with the transaction. Since the smart contract 240, 340, 440 defines the trusted relation between the involved parties that make use of the blockchain 500, according to an embodiment, the smart contract 240, 340, 440 520 acts as, or is part of a, genesis block of the blockchain 500.

A unique hash code could in the PLMN2 120, for example by the PLMN2 node 400, be generated and included in the subscriber usage record for each transaction given rise to by the subscriber 140 having visited the PLMN2 120. The hash code might be included in the blockchain 500 such that each new transaction is associated with the hash code of any previous transactions given rise to by the subscriber 140, or another subscriber 140 of the PLMN1 110, having visited the PLMN2 120.

There could be different ways to send the subscriber usage record. In some examples the subscriber usage record is sent as TAP in/TAP out files within the blockchain 500. As noted above, TAP is short for Transferred Account Procedures and could include its evolutions TAP2 and TAP3.

As noted above with reference to FIG. 1, there might in addition to the PLMN1 110 and the PLMN2 120 be yet further PLMN:s. All other PLMN:s than PLMN1 110 are herein therefore collectively denoted as PLMN2:s 120. That is in some examples there are more than one PLMN2 120. All, or some, of these PLMN2:s 120 might then be hierarchically related according to operator precedence as defined by the PLMN1 110. For example, there might be different privileges for the different PLMN2:s 120 as determined according to the operator precedence. Any number of PLMN:s can be involved in the transactions based on the operator precedence with the appropriate privileges.

There might be different types of PLMN:s. In some examples the PLMN1 110 is the home PLMN of the subscriber 140 and the PLMN2 120 is a visitor PLMN of the subscriber 140.

Additional aspects of the smart contract 240, 340, 440 will now be disclosed.

As disclosed above, a private blockchain network 130 is used for handling the subscriber usage records. In some aspects, the private blockchain network 130 requires a hyperledger composer to be created. In general terms, as the skilled person understands, a hyperledger composer is a set of collaboration tools for building blockchain networks 130 that enables the creation of smart contracts 240, 340, 440 and blockchain applications. Three primary configurations required to create a hyperledger composer are the creation of access control rules (acl file), creation of CTO configuration to represent assets, participants, and transactions (.cto file), and configurations for maintaining the smart contracts 240, 340, 440 (.js file). These primary configurations will be described in the following.

As disclosed above, there are three partners associated with the transactions; PLMN1 110, PLMN2 120, and DCH 150. As further disclosed above, in some aspects only DCH 150 is enabled to modify the transactions as the DCH 150 will perform the actual roaming transaction processing. However, in other aspects, for example based on the operator precedence and agreement, privileges in terms of modifying the transactions might be set differently. Based on the operator precedence, different levels of transaction approval can be kept to each partner.

The PLMN1 110 and the PLMN2 will have a view privileges to the transaction to verify the novelty of the transaction. A control file (.cto file) will be created for each partner. This control file will hold the assets and participant detail involved in the private blockchain network 130. The smart contracts 240, 340, 440 are the entities which have the rating logic to perform the rating of a roaming transaction and the aggregation logic to generate the partner settlement invoices. The smart contracts 240, 340, 440 are maintained as a .js file in the hyperledger composer.

In summary, a method for implementing a billing process between PLMN1 110 and PLMN2 120 for a subscriber 140 of the PLMN1 110 that visits the PLMN2 120 comprises:

S102, S202, S302: Establishing a smart contract 240, 340, 440 between the PLMN1 110, the PLMN2 120, and the DCH 150.

S104, S204: Sending a subscriber usage record, represented by a distributed ledger, of the subscriber 140 from the PLMN2 120 to the DCH 150 (and thus obtaining the subscriber usage record by the DCH 150 from the PLMN2 120) using a blockchain 500 upon the subscriber 140 having visited the PLMN2 120. The blockchain 500 is based on the smart contract 240, 340, 440.

S106, S304: Sending the subscriber usage record from the DCH 150 to the PLMN1 110 using the blockchain 500 (and thus obtaining the subscriber usage record by the PLMN1 110 from the DCH 150).

Figure 6:
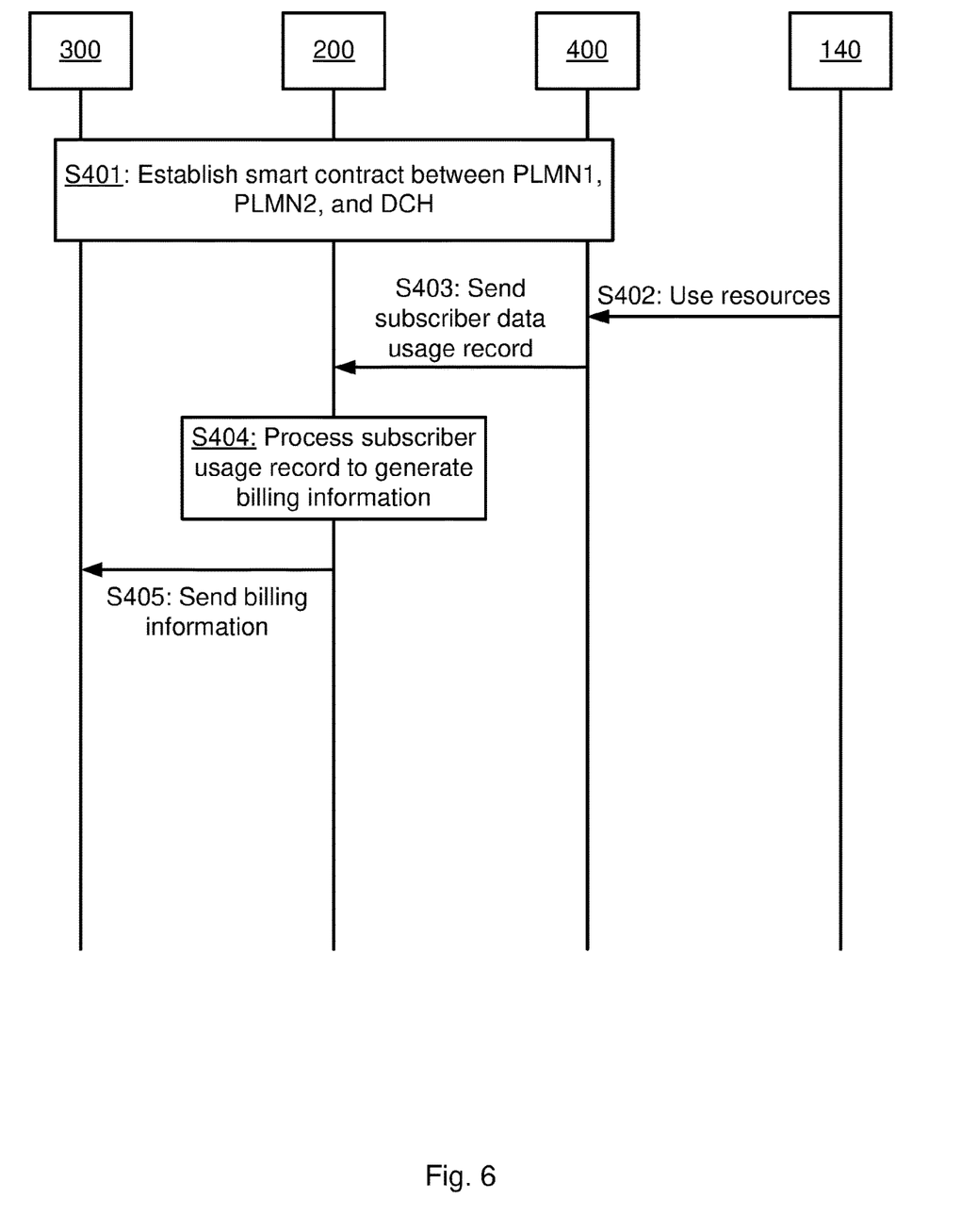
FIG. 6 is a signalling diagram of a method according to an embodiment.

One particular embodiment for implementing a billing process between PLMN1 110 and PLMN2 120 for a subscriber 140 of the PLMN1 110 that visits the PLMN2 120 based on at least some of the above disclosed embodiments will now be disclosed in detail with reference to the signalling diagram of FIG. 6.

S401: The PLMN1 node 300, the PLMN2 node 400, and the DCH 150 establish a smart contract 240, 340, 440, as in above steps S102, S202, S302.
S402: The subscriber 140 of PLMN1 110 consumes data, or other resources, in the PLMN2 120.
S403: The PLMN2 node 400 sends, for example from a mobile switching center, a subscriber usage record, for examples in the form of TAP in/TAP out files, of the subscriber 140 to the DCH 150, which thus obtains the subscriber usage record, as in above steps S104, S204.
S404: The DCH 150 processes the subscriber usage record according to the smart contract 240, 340, 440 to generate billing information for the subscriber 140.
S405: The DCH 150 sends the subscriber usage record, in the form of billing information, to the PLMN1 110 using the blockchain 500, which thus obtains the subscriber usage record, as in steps S106, S304. The subscriber usage record might be received by a mobile switching center in the PLMN1 110.

Figure 7:
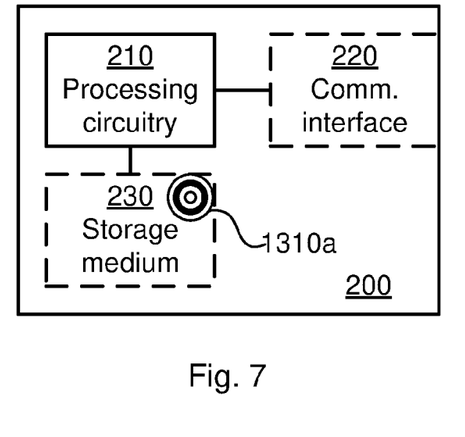
FIG. 7 is a schematic diagram showing functional units of a DCH node according to an embodiment.

FIG. 7 schematically illustrates, in terms of a number of functional units, the components of a DCH node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the DCH node 200 to perform a set of operations, or steps, as disclosed above. For example, the storage medium 230 may store the set of operations, and the processing circuitry 210 may be configured to retrieve the set of operations from the storage medium 230 to cause the DCH node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The DCH node 200 may further comprise a communications interface 220 for communications with the PLMN1 node 300 and the PLMN2 node 400. As such the communications interface 220 may comprise one or more transmitters and receivers, comprising analogue and digital components.

The processing circuitry 210 controls the general operation of the DCH node 200 e.g. by sending data and control signals to the communications interface 220 and the storage medium 230, by receiving data and reports from the communications interface 220, and by retrieving data and instructions from the storage medium 230. Other components, as well as the related functionality, of the DCH node 200 are omitted in order not to obscure the concepts presented herein.

Figure 8:
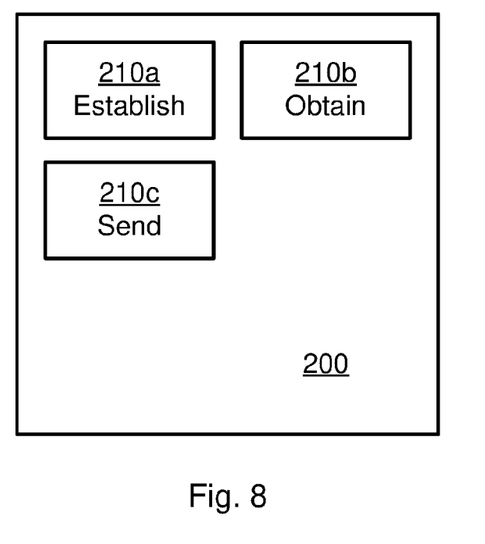
FIG. 8 is a schematic diagram showing functional modules of a DCH node according to an embodiment.

FIG. 8 schematically illustrates, in terms of a number of functional modules, the components of a DCH node 200 according to an embodiment. The DCH node 200 of FIG. 8 comprises a number of functional modules; an establish module 210a configured to perform step S102, an obtain module 210b configured to perform step S104, and a send module 210c configured to perform step S106. The DCH node 200 of FIG. 8 may further comprise a number of optional functional modules. In general terms, each functional module 210a-210c may be implemented in hardware or in software. Preferably, one or more or all functional modules 210a-210c may be implemented by the processing circuitry 210, possibly in cooperation with the communications interface 220 and the storage medium 230. The processing circuitry 210 may thus be arranged to from the storage medium 230 fetch instructions as provided by a functional module 210a-210c and to execute these instructions, thereby performing any steps of the DCH node 200 as disclosed herein.

Figure 9:
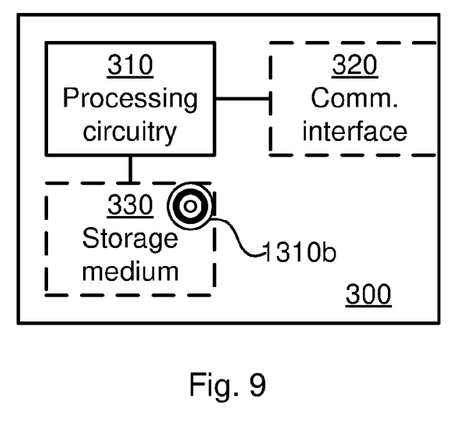
FIG. 9 is a schematic diagram showing functional units of a PLMN2 node according to an embodiment.

FIG. 9 schematically illustrates, in terms of a number of functional units, the components of a PLMN2 node 400 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the PLMN2 node 400 to perform a set of operations, or steps, as disclosed above. For example, the storage medium 330 may store the set of operations, and the processing circuitry 310 may be configured to retrieve the set of operations from the storage medium 330 to cause the PLMN2 node 400 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The PLMN2 node 400 may further comprise a communications interface 320 for communications with the PLMN1 node 300 and the DCH 150. As such the communications interface 320 may comprise one or more transmitters and receivers, comprising analogue and digital components.

The processing circuitry 310 controls the general operation of the PLMN2 node 400 e.g. by sending data and control signals to the communications interface 320 and the storage medium 330, by receiving data and reports from the communications interface 320, and by retrieving data and instructions from the storage medium 330. Other components, as well as the related functionality, of the PLMN2 node 400 are omitted in order not to obscure the concepts presented herein.

Figure 10:
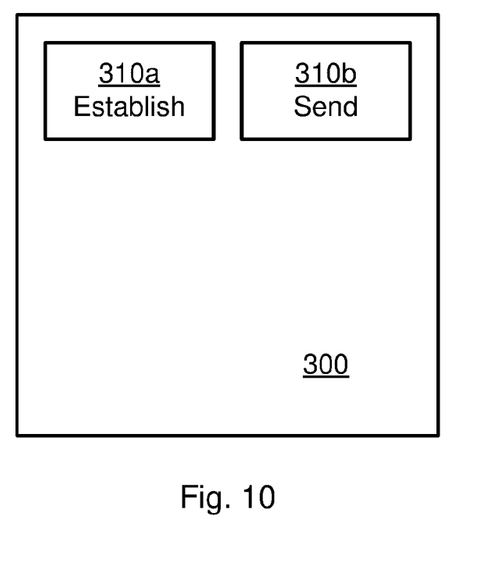
FIG. 10 is a schematic diagram showing functional modules of a PLMN2 node according to an embodiment.

FIG. 10 schematically illustrates, in terms of a number of functional modules, the components of a PLMN2 node 400 according to an embodiment. The PLMN2 node 400 of FIG. 10 comprises a number of functional modules; an establish module 310a configured to perform step S202, and a send module 310b configured to perform step S204. The PLMN2 node 400 of FIG. 10 may further comprise a number of optional functional modules. In general terms, each functional module 310a-310b may be implemented in hardware or in software. Preferably, one or more or all functional modules 310a-310b may be implemented by the processing circuitry 310, possibly in cooperation with the communications interface 320 and the storage medium 330. The processing circuitry 310 may thus be arranged to from the storage medium 330 fetch instructions as provided by a functional module 310a-310b and to execute these instructions, thereby performing any steps of the PLMN2 node 400 as disclosed herein.

Figure 11:
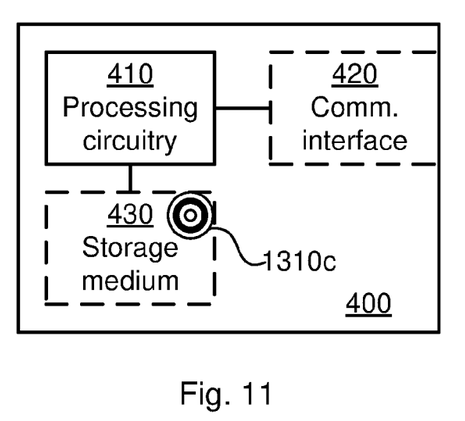
FIG. 11 is a schematic diagram showing functional units of a PLMN1 node according to an embodiment.

FIG. 11 schematically illustrates, in terms of a number of functional units, the components of a PLMN1 node 300 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1310c (as in FIG. 13), e.g. in the form of a storage medium 430. The processing circuitry 410 may further be provided as at least one application specific integrated circuit (ASIC), or field programmable gate array (FPGA).

Particularly, the processing circuitry 410 is configured to cause the PLMN1 node 300 to perform a set of operations, or steps, as disclosed above. For example, the storage medium 430 may store the set of operations, and the processing circuitry 410 may be configured to retrieve the set of operations from the storage medium 430 to cause the PLMN1 node 300 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The PLMN1 node 300 may further comprise a communications interface 420 for communications with the PLMN2 node 400 and the DCH 150. As such the communications interface 420 may comprise one or more transmitters and receivers, comprising analogue and digital components.

The processing circuitry 410 controls the general operation of the PLMN1 node 300 e.g. by sending data and control signals to the communications interface 420 and the storage medium 430, by receiving data and reports from the communications interface 420, and by retrieving data and instructions from the storage medium 430. Other components, as well as the related functionality, of the PLMN1 node 300 are omitted in order not to obscure the concepts presented herein.

Figure 12:
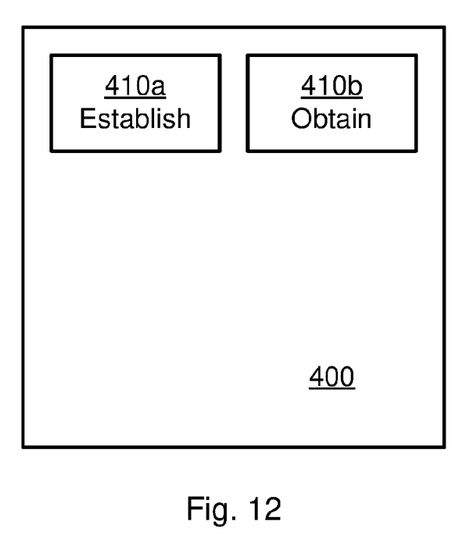
FIG. 12 is a schematic diagram showing functional modules of a PLMN1 node according to an embodiment.

FIG. 12 schematically illustrates, in terms of a number of functional modules, the components of a PLMN1 node 300 according to an embodiment. The PLMN1 node 300 of FIG. 12 comprises a number of functional modules; an establish module 410a configured to perform step S302, and an obtain module 410b configured to perform step S304. The PLMN1 node 300 of FIG. 12 may further comprise a number of optional functional modules. In general terms, each functional module 410a-410b may be implemented in hardware or in software. Preferably, one or more or all functional modules 410a-410b may be implemented by the processing circuitry 410, possibly in cooperation with the communications interface 420 and the storage medium 430. The processing circuitry 410 may thus be arranged to from the storage medium 430 fetch instructions as provided by a functional module 410a-410b and to execute these instructions, thereby performing any steps of the PLMN1 node 300 as disclosed herein.

Any of the DCH node 200, the PLMN1 node 300, and the PLMN2 node 400 may be provided as a respective stand-alone device or as a part of at least one further device. Thus, a first portion of the instructions performed by each of the DCH node 200, the PLMN1 node 300, and the PLMN2 node 400 may be executed in a respective first device, and a second portion of the of the instructions performed by each of the DCH node 200, the PLMN1 node 300, and the PLMN2 node 400 may be executed in a respective second device; the herein disclosed embodiments are not limited to any particular number of devices on which the instructions performed by the DCH node 200, the PLMN1 node 300, and the PLMN2 node 400 may be executed. Hence, the methods according to the herein disclosed embodiments are suitable to be performed by a DCH node 200, a PLMN1 node 300, and a PLMN2 node 400 residing in a cloud computational environment. Therefore, although a single processing circuitry 210, 310, 410a is illustrated in FIGS. 7, 9, and 11, the processing circuitry 210, 310, 410 may be distributed among a plurality of devices, or nodes. The same applies to the functional modules 210a-210c, 310a-310b, 410a-410b of FIGS. 8, 10, and 12 and the computer programs 1310a, 1310b, 1310c of FIG. 13.

Figure 13:
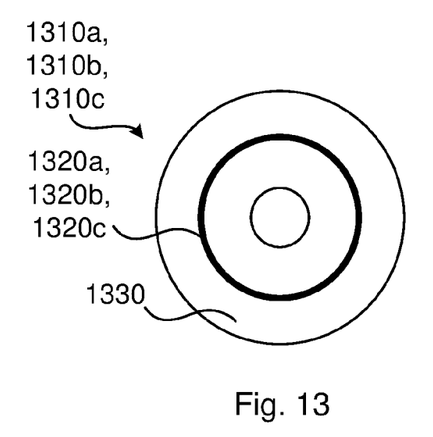
FIG. 13 shows one example of a computer program product comprising computer readable means according to an embodiment.

FIG. 13 shows one example of a computer program product 1310a, 1310b, 1310c comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any steps of the DCH node 200 as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any steps of the PLMN2 node 400 as herein disclosed. On this computer readable means 1330, a computer program 1320c can be stored, which computer program 1320c can cause the processing circuitry 410 and thereto operatively coupled entities and devices, such as the communications interface 420 and the storage medium 430, to execute methods according to embodiments described herein. The computer program 1320c and/or computer program product 1310c may thus provide means for performing any steps of the PLMN1 node 300 as herein disclosed.

In the example of FIG. 13, the computer program product 1310a, 1310b, 1310c is illustrated as an optical disc, such as a CD (compact disc) or a DVD (digital versatile disc) or a Blu-Ray disc. The computer program product 1310a, 1310b, 1310c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b, 1320c is here schematically shown as a track on the depicted optical disk, the computer program 1320a, 1320b, 1320c can be stored in any way which is suitable for the computer program product 1310a, 1310b, 1310c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for implementing a billing process between a first Public Land Mobile Network (PLMN1) and a second Public Land Mobile Network (PLMN2) for a subscriber of the PLMN1 that visits the PLMN2, the method comprising:
   establishing a smart contract among the PLMN1, the PLMN2, and a Data Clearance House (DCH);
   sending a subscriber usage record, represented by a distributed ledger, of the subscriber from the PLMN2 to the DCH using a blockchain upon the subscriber having visited the PLMN2, wherein the blockchain is based on the smart contract;
   generating, at the DCH, billing information from the subscriber usage record; and
   sending the billing information from the DCH to the PLMN1 using the blockchain.

2. The method according to claim 1, wherein the smart contract acts as, or is part of, a genesis block of the blockchain.

3. The method according to claim 1, wherein a unique hash code is in the PLMN2 generated and included in the subscriber usage record for each transaction given rise to by the subscriber having visited the PLMN2.

4. The method according to claim 3, wherein the hash code is included in the blockchain such that each new transaction is associated with the hash code of any previous transactions given rise to by the subscriber, or another subscriber of the PLMN1, having visited the PLMN2.

5. The method according to claim 1, wherein the subscriber usage record is sent as TAP (Transferred Account Procedures) in/TAP out files within the blockchain.

6. The method according to claim 1, wherein the smart contract holds information of agreed rate plans between the PLMN1 and the PLMN2 for the PLMN2 to process transaction data, as represented by the subscriber usage record, for the subscriber.

7. The method according to claim 1, wherein the smart contract holds information of rules for controlling access to the subscriber usage record from the PLMN1, the PLMN2, and the DCH.

8. The method according to claim 1, wherein according to the smart contract, only the DCH is allowed to, as required by the billing process, generate the billing information from the subscriber usage record.

9. The method according to claim 1, wherein there are more than one PLMN2, and wherein the PLMN2s are hierarchically related according to operator precedence as defined by the PLMN1.

10. The method according to claim 9, wherein there are different privileges for different PLMN2s as determined according to the operator precedence.

11. The method according to claim 1, wherein the PLMN1 is a home PLMN of the subscriber and wherein the PLMN2 is a visitor PLMN of the subscriber.

12. A method for implementing a billing process between a first Public Land Mobile Network (PLMN1), and a second Public Land Mobile Network (PLMN2), for a subscriber of the PLMN1 that visits the PLMN2, the method being performed by a Data Clearance House (DCH) node, the method comprising:
   establishing a smart contract among the PLMN1, the PLMN2, and the DCH;
   obtaining a subscriber usage record, represented by a distributed ledger, of the subscriber from the PLMN2 and using a blockchain upon the subscriber having visited the PLMN2, wherein the blockchain is based on the smart contract;
   generating billing information from the subscriber usage record; and
   sending the billing information to the PLMN1 using the blockchain.

13. A method for implementing a billing process between a first Public Land Mobile Network (PLMN1), and a second Public Land Mobile Network (PLMN2), for a subscriber of the PLMN1 that visits the PLMN2, the method being performed by a node in the PLMN2, the method comprising:
   establishing a smart contract among the PLMN1, the PLMN2, and a Data Clearance House (DCH); and
   sending a subscriber usage record, represented by a distributed ledger, of the subscriber to the DCH using a blockchain upon the subscriber having visited the PLMN2, wherein the blockchain is based on the smart contract and wherein the DCH generates billing information from the subscriber usage record, in which the DCH sends the billing information to the PLMN1 using the blockchain.

14. A method for implementing a billing process between a first Public Land Mobile Network (PLMN1), and a second Public Land Mobile Network (PLMN2), for a subscriber of the PLMN1 that visits the PLMN2, the method being performed by a node in the PLMN1, the method comprising:
   establishing a smart contract among the PLMN1, the PLMN2, and a Data Clearance House (DCH); and
   obtaining, from the DCH, billing information generated from a subscriber record, in which the subscriber record originates from the PLMN2 upon the subscriber having visited the PLMN2 and the subscriber record represented by a distributed ledger of the subscriber and using a blockchain, wherein the blockchain is based on the smart contract and wherein the DCH sends the billing information using the blockchain.

* * * * *